US007551291B2

(12) United States Patent
Brasen et al.

(10) Patent No.: US 7,551,291 B2
(45) **Date of Patent: *Jun. 23, 2009**

(54) INTERFEROMETRIC HEIGHT MEASUREMENT

(75) Inventors: Gernot Brasen, Mainz (DE); Christian Laue, Mainz (DE); Matthias Loeffler, Eisenberg (DE); Heiko Theuer, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/059,001

(22) Filed: Mar. 31, 2008

(65) Prior Publication Data

US 2008/0180687 A1 Jul. 31, 2008

Related U.S. Application Data

(63) Continuation of application No. 11/481,101, filed on Jul. 5, 2006, now Pat. No. 7,397,569.

(51) Int. Cl.
*G01B 11/30* (2006.01)

(52) U.S. Cl. ...................................... 356/495; 356/516

(58) Field of Classification Search ................. 356/489, 356/495, 512–516
See application file for complete search history.

(56) References Cited

U.S. PATENT DOCUMENTS 4,298,283 A * 11/1981 Makosch et al. ............ 356/495
4,844,616 A * 7/1989 Kulkarni et al. ............. 356/495
5,392,116 A * 2/1995 Makosch .................... 356/495
5,604,591 A * 2/1997 Kitagawa .................... 356/491
5,914,782 A * 6/1999 Sugiyama ................... 356/491
6,295,131 B1 * 9/2001 Yamaba et al. .............. 356/493
6,580,515 B1 * 6/2003 Li et al. ...................... 356/516
6,856,384 B1 * 2/2005 Rovira ......................... 356/73
7,221,459 B2 5/2007 Brasen et al.
7,397,569 B2 7/2008 Brasen et al.

FOREIGN PATENT DOCUMENTS

JP 410293019 A * 11/1998

OTHER PUBLICATIONS

Turner, Samuel A., Non-final Office Action dated Sep. 15, 2008; U.S. Appl. No. 12/059,017; pp. 1-7.

* cited by examiner

*Primary Examiner*—Samuel A Turner
(74) *Attorney, Agent, or Firm*—Dillon & Yudell LLP

(57) ABSTRACT

The invention relates to an interferometric method for measuring a height of a first region on a first surface, the first surface having first areas having first optical properties and second areas having second optical properties, the method comprising the steps of generating of first and second coherent light beams, reflecting at least the first coherent light beam from the first region into a first return beam and reflecting the second coherent light beam from a second region into a second return beam, measuring at least a first reflectivity of the first region, determining a topography-dependent phase shift of the first and second return beams for the height measurement based on the first reflectivity.

7 Claims, 2 Drawing Sheets

INTERFEROMETRIC HEIGHT MEASUREMENT

CROSS REFERENCE TO RELATED APPLICATION

This application is a continuation of U.S. application Ser. No. 11/481,101, filed on Jul. 5, 2006, entitled "Method and System for Interferometric Height Measurement," the contents of which are hereby incorporated by reference.

BACKGROUND OF THE INVENTION

1. Technical Field

The present invention relates to the field of interferometric measuring methods, for applications such as profile measurements, roughness measurements, plainness measurements, and measurements of the radius of curvature as well as to an arrangement for implementing this method.

2. Description of the Related Art

Interferometers are being increasingly used in a number of production processes to characterize and measure surfaces. Optical measuring devices of this kind are distinguished by a high degree of measuring accuracy. For manufacturing, it is desirable to make measurements without contacting the measured part to avoid damage. It is also desirable that measurements be fully automated.

A measuring device of this kind is the Laser Spot Scanning Interferometer (LASSI) described in U.S. Pat. No. 4,298,283 assigned to the assignee of the present invention, incorporated herein by reference. The underlying measuring principle is based on scanning the surface to be tested with two laser light beams which are simultaneously focused adjacent to each other onto the surface. During this process, the optical phase difference between the two light waves, which are reflected from the surface, changes linearly as a function of the height difference between the two laser spots on the surface. The phase difference is determined by phase shifting. For this purpose, an electro-optical light modulator is used which periodically shifts the phase difference between the two light waves by a fixed amount. At the same time, the intensity of the two interfering light beams is measured by a photodiode.

U.S. Pat. No. 5,392,116 which is assigned to the assignee of the present invention and is incorporated herein by reference, shows an interferometric phase measurement method, which permits simultaneous signal evaluation.

The orthogonally polarized light beams with the phase difference are initially split by a beam splitter into several partial beam pairs, which, by means of a lens, are focused as parallel beams into a phase shifter, a polarizer, and an array of light sensors. Phase differences of the light beams create intensity differences between the beams received by the different light sensors. High measuring speed and accuracy are thus provided. When combined with means for directing two spatially separated orthogonally polarized beams on a surface, the method and apparatus can be used to determine height differences along the surface.

The present invention aims to provide an improved interferometric method and apparatus for enabling an increased precision of the interferometric measurement.

SUMMARY OF THE INVENTION

The present invention provides an improved interferometric method, which eliminates the material-dependent phase shift from the total phase shift of the reflected return beams. This material-dependent phase shift, which is also referred to as phase change on reflection (Fresnel phase shift), occurs when light is reflected from a dielectric or a metal and is dependent on the optical properties of the reflecting surface, in particular the index of refraction and the index of absorption and the optical properties of the ambient medium.

When the measurement beam is moved over different areas of the reflecting surface having different optical properties the material-dependent phase shift changes correspondingly and thus introduces a measurement error. By measuring the actual material dependent phase shift for the region onto which the measurement beam is currently directed this measurement error is eliminated.

The determination of the current material-dependent phase shift is performed based on a reflectivity measurement of the region on the reflecting surface onto which the measurement beam is directed. When the optical properties of the reference surface which reflects the reference beam is known, this facilitates determination of the material-dependent phase shift.

In accordance with a preferred embodiment of the invention both the measurement beam and the reference beam are reflected by the same surface. In this instance both the reflectivity of the region of the surface reflecting the measurement beam as well as the reflectivity of the surface region which reflects the reference beam need to be measured for the determination of the material-dependent phase shift.

In accordance with a further preferred embodiment of the invention the fringe visibility value, which is delivered by a phase analyzer, is used to further improve the precision of the calculation of the material-dependent phase shift.

The present invention is particularly advantageous for measuring the topography of a surface which has a random distribution of areas having two different optical properties. An example for such a surface is AlTiC substrate ($Al_2O_3$—TiC) which consists of $Al_2O_3$ in which TiC particles having randomly varying sizes and forms are embedded. Such an AlTiC substrate is used for the production of storage disk read/write heads. The interferometric method of the invention can thus be advantageously employed for measuring the topography of the read/write head surface in the production of such heads and for quality monitoring.

BRIEF DESCRIPTION OF THE DRAWINGS

In the following text, preferred embodiments of the invention will be described in greater detail by making reference to the drawings in which.

DETAILED DESCRIPTION OF A PREFERRED EMBODIMENT

Figure 1:
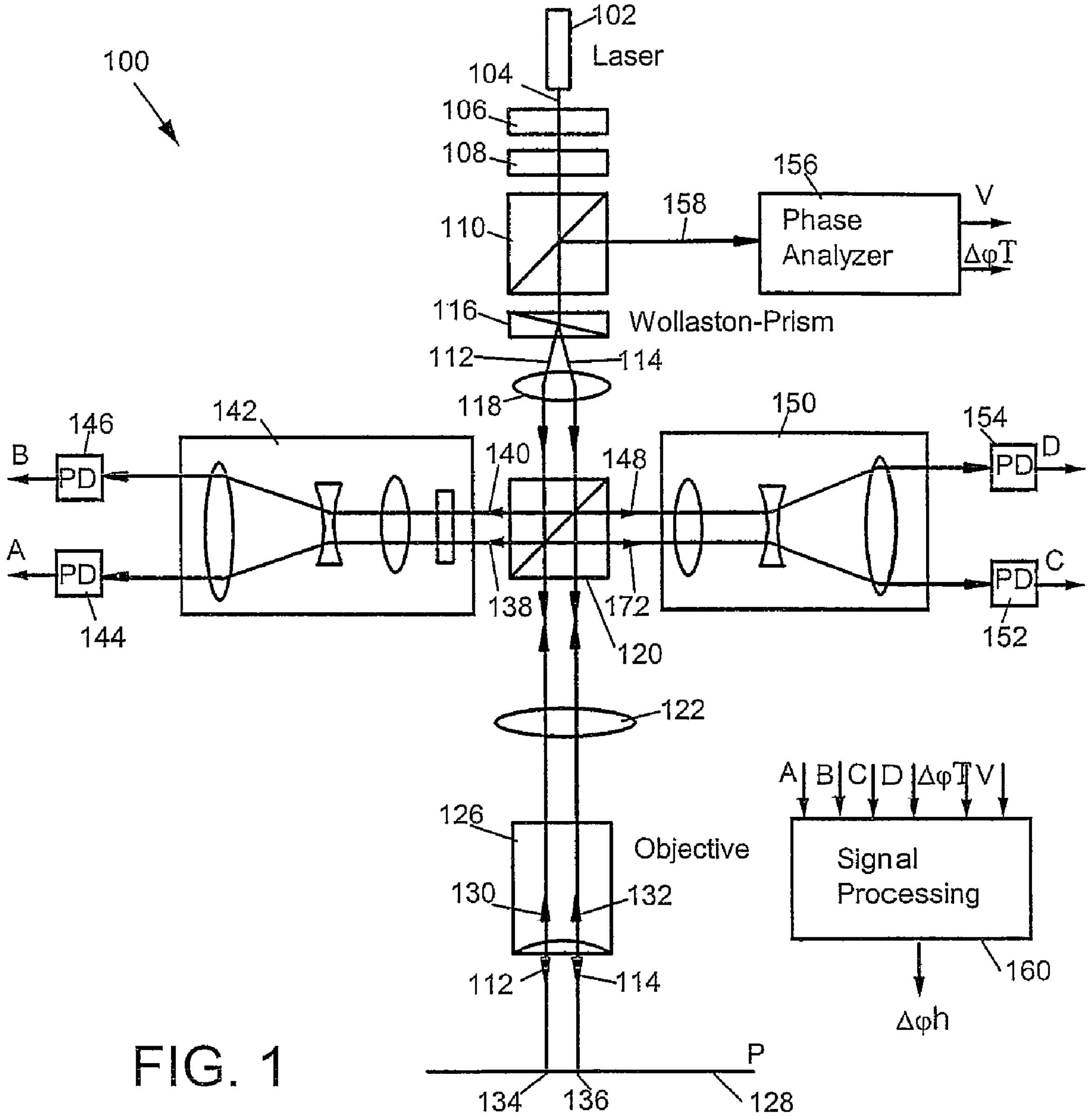
FIG. 1 shows a block diagram of an interferometric system.

FIG. 1 shows interferometric system 100 having a laser 102 for generating laser beam 104. Laser beam 104 passes through λ/2-plate 106 and is polarized by linear polarizer 108. The polarized laser beam 104 goes through beam splitter 110 and is divided into coherent light beams 112 and 114 by Wollaston-prism 116. Orthogonally polarized light beams 112 and 114 pass through lens 118, beam splitter 120, lens 122, and objective lens 126 before they are reflected from surface 128 to be measured. Light beam 112 is reflected from region 134 into return beam 130. Light beam 114 is reflected from region 136 on surface 128 into return beam 132.

A portion 138 is divided from light beam 112 by beam splitter 120 and directed through optics 142 onto photo diode 144. Photo diode 144 outputs a signal A which is proportional to the intensity of the light beam 112. Likewise beam splitter 120 provides portion 140 of light beam 114 which is directed through optics 142 to photo diode 146 which outputs a signal B which is proportional to the intensity of light beam 114.

Further, portion 172 of return beam 130 is provided by beam splitter 120 and directed through optics 150 to photo diode 152. Photo diode 152 outputs signal C which is proportional to the intensity of return beam 130. Likewise beam splitter 120 provides portion 148 of return beam 132 which is directed through optics 150 to photo diode 154 which provides signal D which is proportional to the intensity of return beam 132.

Wollaston-prism 116 and beam splitter 110 provide interference beam 158 which results from the interference of the return beams 130 and 132 to phase analyzer 156. Phase analyzer 156 outputs a signal which is proportional to the total phase shift $\Delta\phi_T$ of return beams 130 and 132. Further, phase analyzer 156 provides signal V which is the fringe visibility.

The signals A, B, C, D, $\Delta\phi_T$ and V are inputted into signal processing component 160. By means of the signals A, B, C, D and V, signal processing component 160 eliminates the material-dependent phase shift $\Delta\phi_m$ to provide the topography-dependent phase shift $\Delta\phi_h(\Delta\phi_h=\Delta\phi_T-\Delta\phi_m)$. By means of $\Delta\phi_h$ the exact topography of the surface 128 can be determined.

Figure 2:
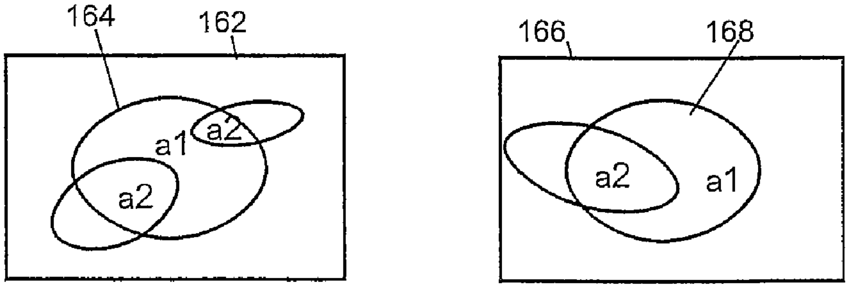
FIG. 2 is illustrative of the random distribution of areas having different optical properties on the measurement surface.

FIG. 2 shows a portion 162 of surface 128 (cf. FIG. 1). In the example considered here surface 128 belongs to a substrate which consists of a first material with embedded particles of a second material; the particles are randomly distributed and have random forms and shapes. For example the first material is $Al_2O_3$ with embedded particles of TiC. Surface areas which are constituted by the first material are designated as $a_1$ and surface areas which are constituted by the second material are designated as $a_2$ in FIG. 2.

Light beam 112 is directed on portion 162 which results in a circular illumination pattern 164. Illumination pattern 164 covers a mixture of surface areas $a_1$ and $a_2$.

Likewise light beam 114 impinges on portion 166 of surface 128 which is also composed of surface areas $a_1$ and $a_2$. Light beam 114 creates illumination pattern 168 on portion 166.

The average reflectivities of the regions covered by illumination patterns 164 and 168, respectively, are used as a basis to determine the material-dependent phase shift $\Delta\phi_m$. This is illustrated in FIG. 3.

Figure 3:
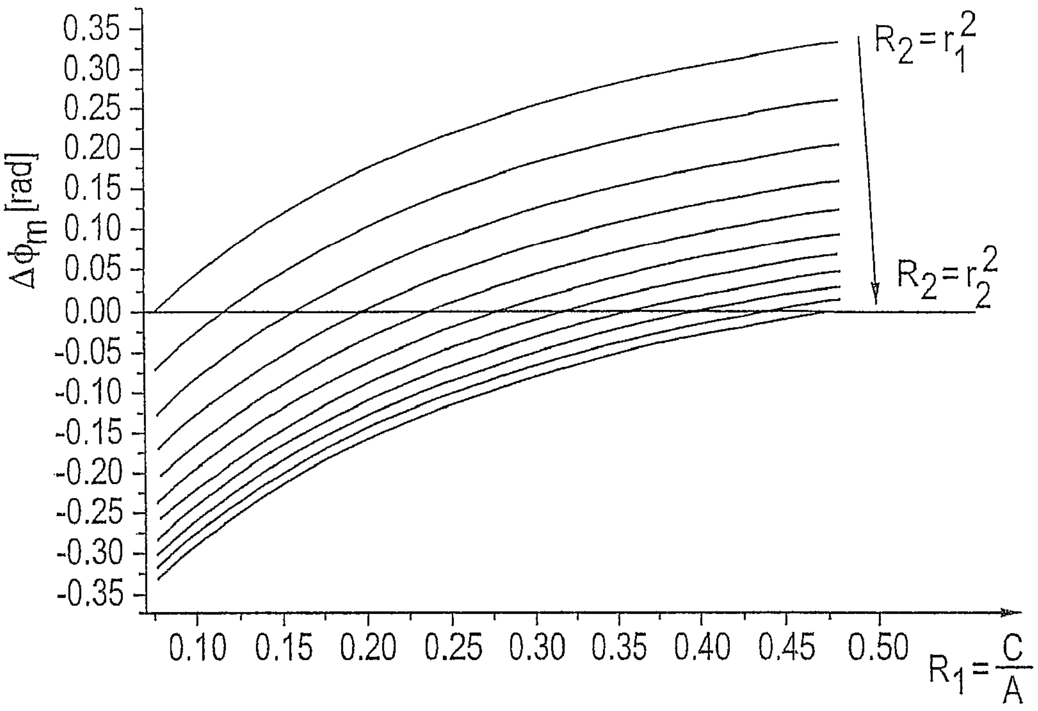
FIG. 3 is a group of curves relating reflectivities to material-dependent phase shifts.

The diagram of FIG. 3 shows the relationship between the reflectivity $R_1$ of the region on surface 128 which is covered by illumination pattern 164, the reflectivity $R_2$ of the region on surface 128 which is covered by illumination pattern 168 and the resulting material-dependent phase shift $\Delta\phi_m$. The reflectivity $R_1$ is obtained by dividing signal C by signal A; likewise the reflectivity $R_2$ is obtained by dividing signal D by signal B (cf. FIG. 1, signal processing component 160). With the $R_1$ and $R_2$ reflectivity values the material-dependent phase shift is determined and subtracted from the total phase shift $\Delta\phi_T$ which is provided by phase analyzer 156 (cf. FIG. 1).

The diagram of FIG. 3 can be obtained by a series of calibration measurements. Alternatively the diagram of FIG. 3 can be obtained by means of a mathematical model:

$$\Delta\varphi_h = \Delta\varphi_T - \Delta\varphi_m$$

$$\Delta\varphi_m = \arcsin(\alpha\beta)$$

$$\alpha = \frac{r_1 r_2 \sin(\varphi_2 - \varphi_1)}{|(r_1)^2 - (r_2)^2|}$$

$$\beta = \frac{1}{2V}\frac{(R_1)^2 - (R_2)^2}{(R_1)^2 + (R_2)^2}$$

where $\Delta\phi_h$: topography-dependent_phase_shift
$\Delta\phi_T$: total_phase_shift
$\Delta\phi_m$: material-dependent_phase_shift
$r_1$: reflection_coefficient_of_material__1
$r_2$: reflection_coefficient_of_material__2
$\phi_1$: phase_shift_caused_by_reflection_from_first_material
$\phi_2$: phase_shift_caused_by_reflection-_from_second_material
$R_1$: reflectivity_of_first_region
$R_2$: reflectivity_of_second_region
V: fringe_visibility It is to be noted that $\alpha$ is a constant for a given pair of materials. This is because the reflection coefficient $r_1$ of the first material, the reflection coefficient $r_2$ of the second material as well as the material-dependent phase shift $\phi_1$ caused by reflection from the first material and the material-dependent phase shift $\phi_2$ caused by reflection from the second material are material constants. Thus $\alpha$ only needs to be calculated once for a given material pair which constitutes a surface and can be stored for future reference.

The value of $\beta$ needs to be recalculated for each position of the illumination patterns 164 and 168 as the reflectivities $R_1$ and $R_2$ can randomly vary between the values $|r1|^2$ and $|r2|^2$.

As is apparent from the above mathematical model $\Delta\phi_h=\Delta\phi_T$, if $R_1=R_2$. Hence, when $R_1=R_2$ the total phase shift does not require a correction. This enables one embodiment, where a height value is only outputted, when $R_1=R_2$ as in this instance no correction of the total phase difference is needed.

Alternatively only light beam 112 serves as a measurement beam whereas light beam 114 serves as a reference light beam. In this instance light beam 114 is reflected from a reference surface having known optical properties. In this case only the reflectivity $R_1$ needs to be measured for the calculation of $\beta$ and $\Delta\phi_m$.

Figure 4:
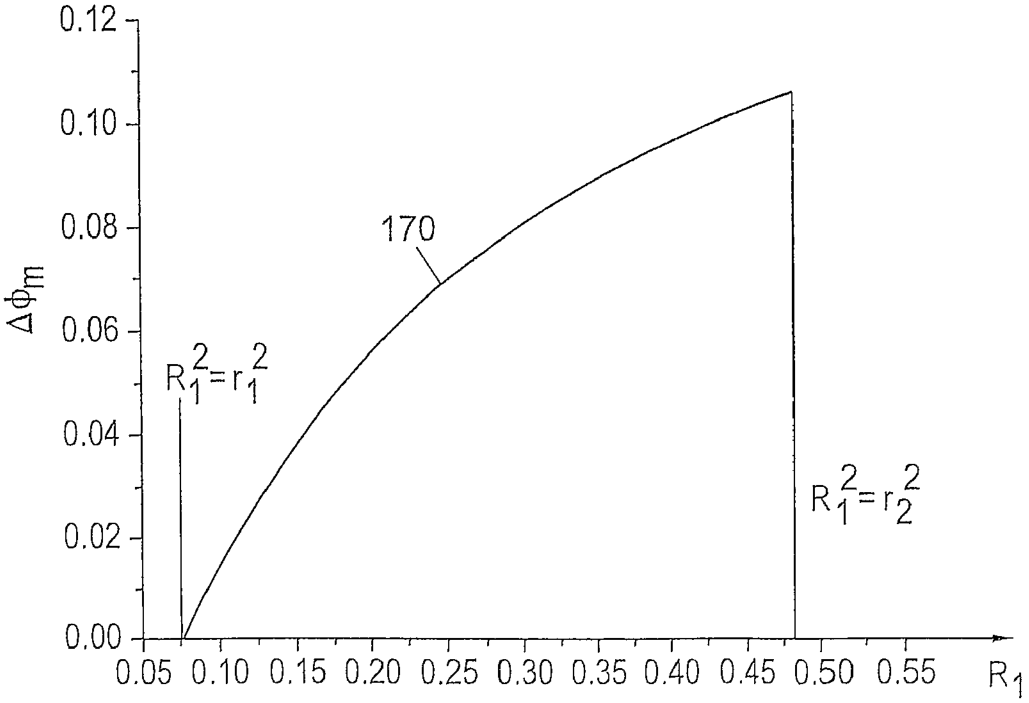
FIG. 4 is a curve relating the reflectivity of the measurement beam to the material-dependent phase shift.

This situation is illustrated in the diagram of FIG. 4 where the diagram of FIG. 3 is reduced to a single curve 170 which relates the measured reflectivity $R_1$ to the material-dependent phase shift $\Delta\phi_m$. When the illumination pattern 164 of light beam 112 covers a region which only consists of Al2O3 the additional phase shift $\Delta\phi_m$ is about 0 whereas when illumination pattern 164 covers a region which only consists of TiC the phase shift $\Delta\phi_m$ is about 0.106 $\pi$ which corresponds to a virtual height of about 16 nanometers for a measurement wavelength of 633 nanometers. This way a measurement error of up to 16 nanometers can be eliminated in the example considered here.

What is claimed is:

1. A machine-readable medium having a plurality of instructions processable by a machine embodied therein, wherein said plurality of instructions, when processed by said machine, causes said machine to perform a method, said method comprising:

generating a first coherent light beam and a second coherent light beam;

reflecting at least said first coherent light beam from a first region into a first return beam and reflecting said second coherent light beam from a second region into a second return beam;

measuring at least a first reflectivity of said first region;

determining a topography-dependent phase shift of said first return beam and said second return beam based on said first reflectivity, wherein said determining step further comprises determining said topography-dependent phase shift with reference to a curve relating said first reflectivity to a material-dependent phase shift; and measuring a height based on said topography-dependent phase shift.

2. The machine-readable medium of claim 1, wherein said step of determining said topography-dependent phase shift further comprises determining said topography-dependent phase shift based on an optical property of an area covered by said first region.

3. The machine-readable medium of claim 1, wherein said determining step further comprises employing a reflectivity of a second region on a reference surface having known optical properties.

4. The machine-readable medium of claim 1, wherein said determining step further comprises:

measuring a second reflectivity of a second region on a first surface; and determining the topography-dependent phase shift based on said first reflectivity and said second reflectivity.

5. The machine-readable medium of claim 1, wherein said determining step further comprises determining a fringe visibility for use in determining said topography-dependent phase shift.

6. The machine-readable medium of claim 1, wherein said determining step further comprises determining a topography dependent phase shift through mathematical relationships, comprising:

$$\Delta\varphi_h = \Delta\varphi_T - \Delta\varphi_m;$$

$$\Delta\varphi_m = \arcsin(\alpha\beta);$$

$$\alpha = \frac{r_1 r_2 \sin(\varphi_2 - \varphi_1)}{|(r_1)^2 - (r_2)^2|};$$

$$\beta = \frac{1}{2V}\frac{(R_1)^2 - (R_2)^2}{(R_1)^2 + (R_2)^2};$$

wherein:

$\Delta\phi_h$ is a topography-dependent_phase_shift;

$\Delta\phi_T$ is a total_phase_shift;

$\Delta\phi_m$ is a material-dependent_phase_shift;

$r_1$ is a reflection_coefficient_of_first_area;

$r_2$ is a reflection_coefficient_of_second_area;

$\phi_1$ is a phase shift_caused_by_reflection_from_first_area;

$\phi_2$ is a phase_shift_caused_by_reflection-_from_second_area;

$R_1$ is a reflectivity_of_first_region;

$R_2$ is a reflectivity_of_second_region; and

V is a fringe_visibility.

7. The machine-readable medium of claim 1, wherein:

the determining step further comprises instructions for calculating a material-dependent phase shift based on a first optical property, a second optical property, and a first reflectivity of a first region; and the determining step further comprises instructions for determining a topography-dependent phase shift by subtracting a material-dependent phase shift from a total phase shift of a first reflected coherent light beam and a second reflected coherent light beam.

* * * * *